United States Patent
Gokturk et al.

(10) Patent No.: US 10,412,747 B2
(45) Date of Patent: Sep. 10, 2019

(54) DYNAMIC CHANNEL SELECTION AND DFS RE-ENTRY

(71) Applicant: AirTies Kablosuz Iletism Sanayi Ve Disticaret AS, Istanbul (TR)

(72) Inventors: Muharrem Sarper Gokturk, Istanbul (TR); Maximilian Fricke, Istanbul (TR); Metin Taskin, Istanbul (TR)

(73) Assignee: AIRTIES KABLOSUZ IIETISM SANAYI VE DISTICARET AS, Istanbul (TR)

( * ) Notice: Subject to any disclaimer, the term of this patent is extended or adjusted under 35 U.S.C. 154(b) by 32 days.

(21) Appl. No.: 15/386,533

(22) Filed: Dec. 21, 2016

(65) Prior Publication Data
US 2017/0181178 A1  Jun. 22, 2017

(30) Foreign Application Priority Data
Dec. 22, 2015  (GB) .................................. 1522654.1

(51) Int. Cl.
*H04W 56/00* (2009.01)
*H04W 72/08* (2009.01)

(52) U.S. Cl.
CPC ..... *H04W 72/085* (2013.01); *H04W 56/0005* (2013.01)

(58) Field of Classification Search
CPC ............. H04W 40/12; H04W 56/0005; H04W 56/001; H04W 72/08; H04W 72/085
See application file for complete search history.

(56) References Cited

U.S. PATENT DOCUMENTS 7,286,515 B2 * 10/2007 Olson ................. H04L 63/1433
                                                    370/338
7,289,056 B2 * 10/2007 Liu ......................... G01S 7/021
                                                     342/465

(Continued)

FOREIGN PATENT DOCUMENTS

CN   104640147 A    5/2015
EP   2 262 338 A2   12/2010

(Continued)

OTHER PUBLICATIONS

International Search Report dated Mar. 17, 2017 for International Application No. PCT/EP2016/082126.

(Continued)

*Primary Examiner* — Alpus Hsu
(74) *Attorney, Agent, or Firm* — Harness, Dickey & Pierce, P.L.C.

(57) ABSTRACT

A wireless network device, for operation within a wireless network, the wireless network device comprising: a wireless interface operable on one or more wireless channels; a memory; and a processor configured to: scan at least one channel for a predetermined time duration; and make a channel quality assessment measurement during the predetermined time duration, wherein the processor is adapted to synchronize the predetermined time duration with other wireless network devices that are operable in the wireless network and that scan the at least one channel and make channel quality assessment measurements during substantially the same predetermined time duration, wherein the channel quality assessment measurement is compared with other channel quality assessment measurements from other network devices that are operable in the wireless network thereby to enable determination of an optimal channel for communication between the network devices and wherein (Continued)

the wireless network device is configured to operate on the optimal channel.

19 Claims, 3 Drawing Sheets

(56) References Cited

U.S. PATENT DOCUMENTS

| | | | | |
|---|---|---|---|---|
| 7,370,362 | B2 * | 5/2008 | Olson | H04L 63/1433 726/25 |
| 7,403,748 | B1 * | 7/2008 | Keskitalo | H04B 7/06 455/101 |
| 7,675,878 | B2 * | 3/2010 | Simpson | H04W 48/16 370/229 |
| 7,676,216 | B2 * | 3/2010 | Stieglitz | H04L 63/0492 370/255 |
| 8,432,826 | B2 * | 4/2013 | Heidari | H04W 72/085 370/252 |
| 8,588,149 | B2 * | 11/2013 | Sukiasyan | H04W 72/02 370/329 |
| 8,626,073 | B2 * | 1/2014 | Ruuska | H04B 17/0087 370/330 |
| 8,705,580 | B2 * | 4/2014 | Raman | H04L 12/66 370/536 |
| 8,798,031 | B2 * | 8/2014 | Ishii | H04W 56/005 370/350 |
| 8,897,788 | B2 * | 11/2014 | Ruuska | H04W 48/16 370/310 |
| 9,198,070 | B2 * | 11/2015 | Krishnamurthy | H04L 1/0026 |
| 9,713,099 | B2 * | 7/2017 | Emmanuel | H04B 17/336 |
| 2002/0188723 | A1 * | 12/2002 | Choi | H04W 36/06 709/225 |
| 2006/0239225 | A1 * | 10/2006 | Cho | H04W 36/06 370/329 |
| 2013/0010719 | A1 * | 1/2013 | Shapira | H04W 72/082 370/329 |
| 2015/0334612 | A1 * | 11/2015 | Ray Chaudhuri | H04W 36/0094 455/437 |

FOREIGN PATENT DOCUMENTS

| | | |
|---|---|---|
| IL | 67379 A | 11/1985 |
| WO | WO-2011/056670 A2 | 5/2011 |
| WO | WO-2014/127068 A2 | 8/2014 |
| WO | WO-2014/189912 A1 | 11/2014 |

OTHER PUBLICATIONS

Intellectual Property Office Examination Report dated Feb. 21, 2019 for GB Application No. 1522654.1.
Communication pursuant to Article 94(3) EPC issued by the European Patent Office on Jun. 24, 2019 for EP Application No. 16 815 860.8.

\* cited by examiner

DYNAMIC CHANNEL SELECTION AND DFS RE-ENTRY

This application claims priority to Great Britain Patent Application No. GB1522654.1 filed on Dec. 22, 2015, the entire contents of which are incorporated herein by reference.

FIELD OF THE INVENTION

This invention relates to channel selection in wireless networks. In particular, but not exclusively, the invention relates to channel selection in Wi-Fi mesh networks.

BACKGROUND SUMMARY

In wireless networks, such as Wi-Fi mesh networks, the quality of a channel over which communication is made, is not static, and it is prone to abrupt changes during the day. Further, certain channels are used for particular operations, such as for radar communication, and therefore must be avoided, or only used under certain conditions. The varying nature of the quality of channels in wireless networks makes it difficult to ensure that the selected channel is the optimal one.

In a network of wireless nodes, Wi-Fi utilizes the Carrier Sense Multiple Access (CSMA) mechanism to control the access of nodes to the wireless medium. By doing this, overlapping transmissions of multiple nodes, which lead to collisions, are avoided in the Medium Access Control (MAC) layer. Hence, devices that operate in the same channel need to share the available bandwidth among each other by contention. This leads to diminishing resources in terms of available bandwidth as the number of nodes that use the same channel is increased.

In an effort to increase the medium utilization, Wi-Fi may employ multiple non-overlapping (orthogonal) channels to maintain simultaneous transmissions of different Wi-Fi networks. It is the responsibility of nodes, such as Access Points (APs), to determine the best available channel for operation.

In order to address at least some of the above mentioned problems, there is provided: a wireless network device, for operation within a wireless network, the wireless network device comprising: a wireless interface operable on one or more wireless channels; a memory; and a processor configured to: scan at least one channel for a predetermined time duration; and make a channel quality assessment measurement during the predetermined time duration, wherein the processor is adapted to synchronize the predetermined time duration with other wireless network devices that are operable in the wireless network and that scan the at least one channel and make channel quality assessment measurements during substantially the same predetermined time duration, wherein the channel quality assessment measurement is compared with other channel quality assessment measurements from other network devices that are operable in the wireless network thereby to enable determination of an optimal channel for communication between the network devices and wherein the wireless network device is configured to operate on the optimal channel.

Further aspects of the invention will be apparent from the description and claims.

BRIEF DESCRIPTION OF THE DRAWINGS

The invention is described in reference to the drawings, in which.

DETAILED DESCRIPTION OF AN EMBODIMENT OF THE INVENTION

In order to ensure that the wireless access points of a wireless network have selected the best channel for communication, the access points are configured to assess their local network conditions and disseminate the data within the network, to enable to the network to switch to operate on an optimal channel. An exemplary wireless network is shown at FIG. 1.

Figure 1:
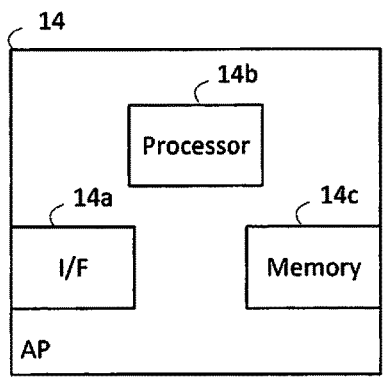
FIG. 1 is a schematic of a wireless network.
Figure 1:
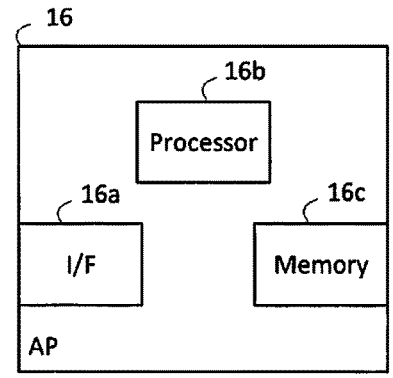
Figure 1:
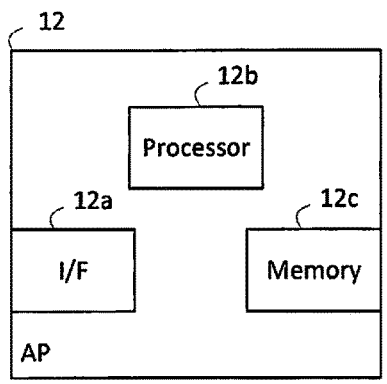
Figure 1:
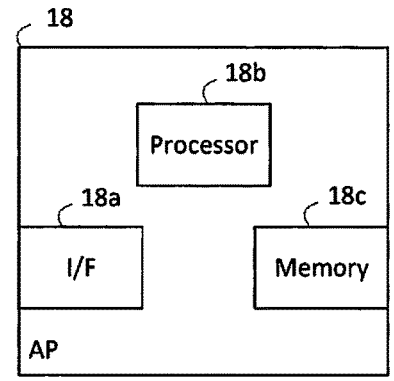
Figure 1:
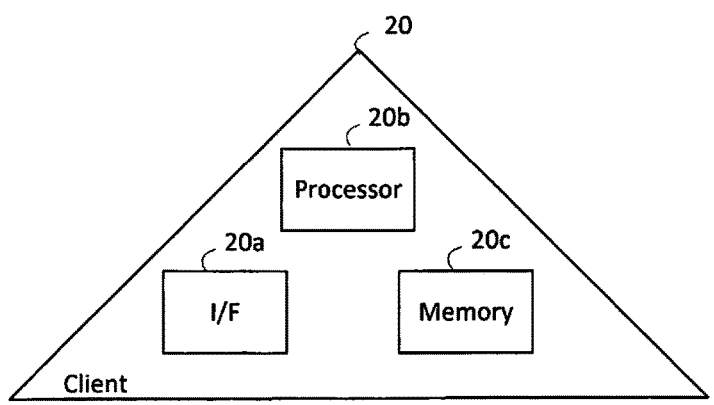

FIG. 1 is a schematic of a wireless network 10 comprising access points. Four access points are shown—AP 12, AP 14, AP 16 and AP 18. Access point 12 comprises an interface 12a, for communicating with other devices, a processor 12b and a memory 12c. Access point 14 comprises an interface 14a, for communicating with other devices, a processor 14b and a memory 14c. Access point 16 comprises an interface 16a, for communicating with other devices, a processor 16b and a memory 16c. Access point 18 comprises an interface 18a, for communicating with other devices, a processor 18b and a memory 18c. Each of the access points AP 12, AP 14, AP 16 and AP 18 can communicate with one another via their interfaces 12a, 14a, 16a, 18a. Communication between the access points AP 12, AP 14, AP 16 and AP 18 may be wired or wireless. Each access point AP 12, AP 14, AP 16 and AP 18 is capable of wireless communication with wireless devices present in the wireless network 10, such as wireless device 20, which can be a client device 20. The client device 20 has an interface 20a for wireless communication, a processor 20b and a memory 20c. The client device 20 may be a mobile device 20 that moves within (and out of) the wireless network 10. The client device may communicate with the access points AP 12, AP 14, AP 16, and AP 18 in order to connect to the internet via a gateway (which may be one of the access points AP 12, AP 14, AP 16, and AP 18).

Whilst four access points AP 12, AP 14, AP 16 and AP 18 are shown in the wireless network 10 of FIG. 1, in further examples, there may be any number of access points. Further, whilst each of the four access point AP 12, AP 14, AP 16 and AP 18 are shown to each have one interface 12a, 14a, 16a and 18a, in further examples, each of the access points AP 12, AP 14, AP 16 and AP 18 may have a plurality of interfaces for communication with other devices. For example, the access points AP 12, AP 14, AP 16 and AP 18 may communicate with each other over different interfaces for each of the 2.4 GHz band and the 5 GHz band, or there may be interconnection between Whilst there is shown one client device 20 in the wireless network 10, there may be more than one client device 20 in the wireless network. Further, whilst the client device 20 is shown to have one interface 20a for communicating with other wireless devices, the client device 20 may also have further interfaces, such as interfaces for communicating over different bands, such as the 2.4 GHz band and the 5 GHz band.

An access point, such as AP 12, AP 14, AP 16 or AP 18, may implement a dynamic channel selection (DCS) mechanism. The DCS mechanism is a dynamic scanning operation performed in the manner described in relation to FIGS. 2 and 3, whereby information on channel statistics observed by every AP in the mesh network (for example APs AP 12, AP 14, AP 16 and AP 18 of FIG. 1) is gathered, and this information is disseminated among all the APs in the network, in order to determine the optimal channel for wireless devices to operate on in the wireless network 10.

Different channel selection methods can be facilitated depending on the performance metrics of interest, for example to select the optimal channel in a Wi-Fi network operating on the 2.4 GHz or the 5 GHz band. Preferably, the channel selection method has an objective of selecting the channel that maximizes the idle time for the worst AP in the mesh network 10. Such a method may be implemented by assessing the channel quality by computing a network-wise single channel quality metric for each available channel and selecting and switching to the best channel with respect to the assessed channel qualities. This is described in greater detail below, with reference to FIGS. 2 and 3.

Figure 2:
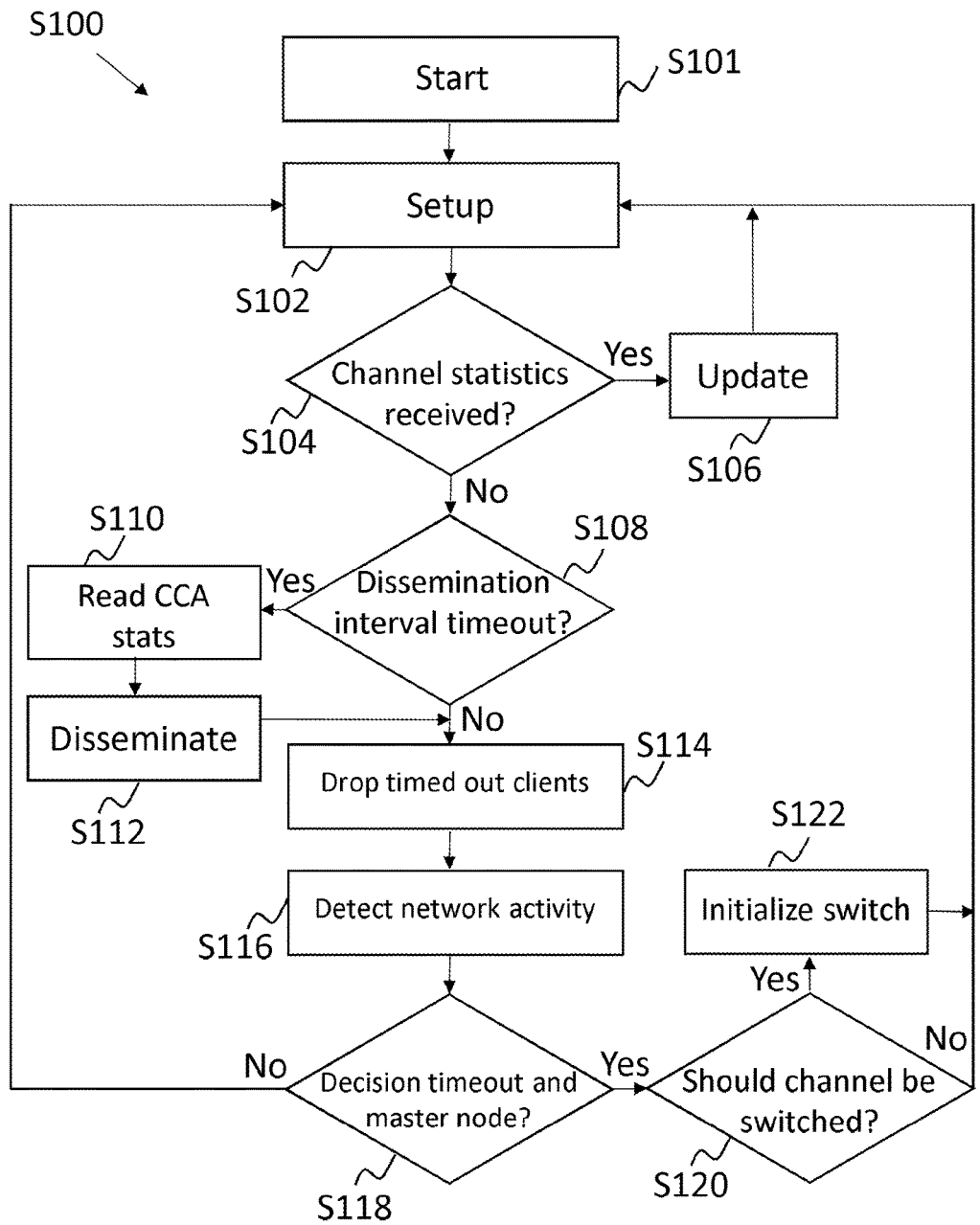
FIG. 2 is a flow chart of a method according to an embodiment of the invention.

FIG. 2 is a flow chart showing the channel selection mechanism according to an embodiment of the invention. The channel selection mechanism can be a daemon running on an access point, such as any of the access points of FIG. 1.

The process commences at step S101, whereby the channel scanning mechanism starts at an access point, such as at any of the access points AP 12, AP 14, AP 16 and AP 18 of FIG. 1. It is preferable that, in a wireless mesh network 10, every mesh node independently gathers information about local channel occupancy statistics. The statistics are then disseminated within the mesh such that every mesh node holds a complete set of the whole mesh's measurements. Therefore, in the example of the wireless mesh network 10 of FIG. 1, it is preferable that each of the access points AP 12, AP 14, AP 16 and AP 18 commence the channel scanning mechanism as described here. Each access point AP 12, AP 14, AP 16 and AP 18 may be adapted to perform channel scanning operations, as well as tracking Clear Channel Assessment (CCA) statistics, data dissemination, channel metric evaluation and decisions, as well as channel switching procedures.

Once the process has been started at step S101, the process then moves to step S102. At step S102 the process of setup and initialization is commenced at the access point that is running the channel switching mechanism. The process setup includes setting up and triggering the kernel module, which may occur when an access point running the channel mechanism is powered, to perform periodic and synchronized channel scans amongst the access points AP 12, AP 14, AP 16 and AP 18. To perform synchronization, as described below, in step S102, each of the access points AP 12, AP 14, AP 16 and AP 18 may compare its local Timing Synchronization Function (TSF) value to one embedded in beacons sent by other access points in the wireless mesh network 10. If the remote TSF is higher than the local one, it is adopted. This assures a mesh-wide synchronization to the highest existent TSF. The process then moves to the main loop of the mechanism at step S104, where it is determined if channel statistics have been received while scanning the channels for the set time duration synchronized amongst each of the access points AP 12, AP 14, AP 16 and AP 18. The main loop implements the processing of received packets from remote peers, the received packets containing CCA statistics for those remote peers. The collected channels statistics include the percentage of the dwell time (i.e. the period for which the scan is performed), in which the channel was observed to be idle. For each channel in an available channels list, a channel score is computed based on the channel statistics gathered and distributed by mesh-APs.

The list of channels subject to scanning, the so called 'available channels', is configurable and identical at all mesh nodes in the wireless mesh network 10. The default set of channels preferably includes all channels in the 5 GHz band that are permitted to be used as defined by the corresponding country's regulations. Channels falling under the Dynamic Frequency Selection (DFS) regulations should not be subject to scanning by default, may however be included optionally if a radar avoidance mechanism such as the one proposed in International Patent Publication Number WO 2013/110472 A1 is employed. Note that the goal of radar avoidance mechanisms is to carry out off-channel channel availability check (CAC) in an effort to detect possible radars and build sufficient confidence on absence of radar in channels that are not the operating channel of the device. If the radar avoidance mechanism marks a channel as radar-free, then this channel can be included in the available channels list that is used by the channel selection method. In this case, DFS channels cannot be checked for radar during run-time, for example due to lack of a radar avoidance mechanism as described in International Patent Publication Number WO 2013/110472 A1, then DFS-re-entry (i.e. the assessment to determine if DFS channels are available to use) is carried out once in a day, preferably early in the morning when the arrival rate in APs (transmit) queues can be lower than 10 Kbps, which is regarded as indicative that there is no client activity. Note that if off-channel CAC is not implemented (or used), then an AP shall carry out in-channel CAC before starting any transmission in a DFS channel. This in-channel CAC disrupts any ongoing communication. That is why, DFS re-entry shall be carried out when there is no wireless activity in the network. When DFS re-entry is carried out, the best channel is selected and the decision as to whether to switch channels, as described below, is given taking into account the scores gathered in the last 24 hours.

In the case radar is detected on a channel, that channel is removed from the available channels list for a duration of 1 hour. Thus, a channel in which radar is detected within the last 1 hour is preferably not a candidate channel.

If it is determined at step S104 that channel statistics have been received, the process moves to step S106. At step S106, the received channel statistics corresponding to the list of available channels are stored locally in the memory of the access point (such as memory 12c, 14c, 16c 18c of access points AP 12, AP 14, AP 16 and AP 18 respectively) that is running the channel scanning mechanism and determining whether channel statistics have been received. Once the channel statistics have been updated, the process moves back to step S102 and the main channel scanning loop continues. Hence received packets are processed to provide up to date information on the state of the network to the access point running the dynamic channel selection mechanism.

In assessing channel statistics in step S104, the quality of a channel can be represented in terms of a score, which corresponds to the percentage of idle time observed in that channel. The idle time of a channel can be measured by periodic and synchronized scans as described with reference to FIGS. 2 and 3, in which during the set time duration synchronized amongst each of the access points AP 12, AP 14, AP 16 and AP 18, an assessment of the channel quality is measured for each of the channels by utilizing the CCA statistics included in the received packets.

Each access point in a mesh network carries out scans in the 20 MHz channels. The score for a channel that has a bandwidth greater than 20 MHz is computed by considering the fact that available airtime is limited by the worst 20 MHz sub-channel within the channel. Thus, the amount of idle time (in percentage) in a channel is computed according to equation 1, as follows:

$$\rho_c(t) = \min_i \rho_{c,i}(t) \quad \text{Equation 1}$$

where $\rho_c(t)$ denotes the percentage of idle time in channel c at time t, $\rho_{c,i}(t)$ denotes the percentage of idle time in subchannel i of channel c at time t.

The decision metric used for assessing and comparing the quality of channel c is calculated by summing up the weighted scores of each sub-channel within the channel. The weights are adjusted in accordance with the bandwidth, such that weight is 1 for 20 MHz, 2 for 40 MHz, and 4 for 80 MHz. The decision metric is computed according to equation 2, as follows:

$$S_{c,W}(t) = \sum_{i=1}^{N} a_i \rho_c(t) \quad \text{Equation 2}$$

where W represents the bandwidth, N represents the number of sub-channels within the channel, t represents the time scanning take place, and $a_i$ represents the weight, namely, $a_1=1$, $a_2=2$, $a_3=4$, for the 20 MHz, 40 Mhz and 80 Mhz channels, respectively.

If it is determined at step S104 that channel statistics have not been received, the process moves to step S108, where it is determined whether there has been a dissemination interval timeout. The dissemination interval is a predetermined time period within which the access point is programmed to gather information for dissemination to other devices in the wireless network 10. Dissemination intervals are configurable but constant. In an example, the dissemination interval is 5 seconds. Dissemination should be performed frequently enough to maximize the freshness of the mesh-wide set of information. However, frequent data dissemination increases network load. The dissemination interval is thus preferably chosen to optimize both the need for fresh information and the need to minimize the load on the network, as far as possible.

If it is determined at step S108 that there has been a dissemination interval timeout, the process moves to step S110. At step S110, the local Clear Channels Assessment (CCA) statistics are read by querying the kernel module of the access point that is running the channel selection mechanism and the process moves to step S112, whereby the channel statistics are disseminated amongst mesh peers (e.g. the other access points) in the wireless network 10. Collection of local channel information from the kernel module is preferably carried out immediately before data dissemination. Data subject to dissemination includes the most recent set of both locally gathered, as well any (previously received) remote peers' channel information. The information is disseminated by unicast addressing the information to the other mesh nodes in the network (for example the access points AP 12, AP 14, AP 16 and AP 18 in the wireless network 10).

The process then moves to step S114.

If it is determined at step S108 that there has not been a dissemination interval timeout, the process also moves to step S114. At step S114, client devices that have not supplied data within the dissemination interval timeout are removed from the list of devices supplying information to the access point that is performing the DCS mechanism. Such client devices are hence dropped and the process moves to step S116, whereby network activity is detected. The network is considered active, if the AP has any associated client devices on any of its interfaces, such as a 2.4 GHz or 5 GHz interface, or if the local wireless network traffic is higher than a certain threshold. In further examples, the network activity is only optionally detected at step S116 of flow chart S100.

The process then moves to step S118. At step S118 it is determined whether the channel switch decision timer has timed out. The decision switch time defines a period of time within which a decision to switch channel operation in the network is to be made. In the event that it is determined that the decision timer has not timed out, the process moves back to step S102 and the main process recommences, whereby further data is gathered in order to make the decision as to whether or not it is necessary or desirable to make a channel switch. If it is determined that the decision timer has timed out, the process moves to step S120, where it is determined if the channel that the network 10 is operating on should be switched. The decision to switch is determined by the master node in the wireless network 10. Any of the access points AP 12, AP 14, AP 16 and AP 18 could be the master node and hence each access point AP 12, AP 14, AP 16 and AP 18 is capable of performing the channel switch decision. The decision to switch channels is based on an assessment of the collected channel statistics, as described below.

Once the decision metric for each scanned channel is computed, every AP in the wireless mesh network 10 shares its score with the other APs in the wireless mesh network 10 (as described above with reference to step S112). After metric dissemination, every AP in the mesh network 10 has the same set of metrics. However, in order to avoid unsynchronized triggering of the channel switch, the decision is given by only one AP in the network 10. For this purpose, an AP is selected as the master AP. In S120, the master AP evaluates the decision metrics by comparing the channel quality assessment measurement for each channel with other channel quality assessment measurements from other network devices, selects the best channel as a desired channel and triggers the channel switch to the desired channel.

The master AP computes, for each channel and the AP, the mean and variance of the decision metrics obtained within a predetermined interval. The mean and the variance of the decision metrics for channel c observed by AP j are denoted as $\mu_j(c)$ and $\sigma_j(c)$, respectively. The master node selects the AP, which has the minimum mean among the mean channel scores of all APs according to equations 3 to 6 below:

$$\arg\max_c \min_j \mu_j(c) \quad \text{Equation 3}$$

$$s.t. \sigma^*(c) < \Gamma_\sigma \quad \text{Equation 4}$$

$$\mu^*(c) > \Gamma_\mu \quad \text{Equation 5}$$

$$\mu^*(c) - \rho_c > \Gamma \quad \text{Equation 6}$$

where $\Gamma_\sigma$ is a configurable variance threshold which is used to ensure that collected statistics vary within a limit, $\Gamma_\mu$ is a configurable threshold for the minimum required mean idle time (in percentage) to regard a channel as a viable alternative, $\rho_c$ is the idle time (in percentage) for the current channel, and $\Gamma$ is the minimum required difference in idle time between the current channel and the alternative channel.

For each channel, the minimum score among all mesh peers is found out. From the resulting scores, the channel having the highest score, i.e., the channel that maximizes the idle time, is selected. In the above formulation, the goal is to maximize the capacity of the weakest link in the mesh network for every channel, thus preventing connectivity losses among mesh peers.

If it is determined that the channel should be switched, the process moves to step S122 and the switch is initialized. If it is determined that the channel should not be switched, the process moves to step S102, whereby the process recommences at a configurable frequency, i.e. the process may be performed periodically such that the optimal channel is dynamically assessed and selected in a wireless mesh network 10.

In order to be a candidate for a channel switch, a channel ideally improves the score with respect to the current channel by a configurable and variable threshold, as described above. Preferably, in an example, this threshold is set as 20%. In further embodiments, a time-based variable threshold can be used instead of a fixed threshold. In a time-based variable threshold, the decision maker can count the number of specific decisions it has made within a specific duration, and can actuate channel switch only if a predetermined but configurable number of decisions are given. For example, if the score difference in percentage between the current channel and a given candidate channel is 50% in a row for 10 consecutive decision periods, then the decision maker can trigger channel switch after the tenth decision. However, the decision maker can trigger a channel switch only after the fifth decision period, if the difference is 100% in a row for the last 5 consecutive decision periods.

Channel switching takes place collectively throughout the mesh by utilizing Extended Channel Switch Announcements (ECSA), as defined by the IEEE 802.11y-2008 amendment, thus informing 802.11y-capable clients prior to switching the channel. While IEEE 802.11y-capable client devices should seamlessly follow to the new channel, actual client device behaviour may vary. Channel switches can be initiated after evaluating and deciding on a suitable channel, as described herein. The node shall start announcing the switch for the duration of a configurable number of beacons. Non-master nodes receiving another mesh peer's ECSA shall react as follows:

(1) Adapt the ECSA, i.e. start to announce the channel switch to clients and other peers themselves, sending ECSAs.
(2) If the local channel switching procedure is already in progress, ignore the received announcement.
(3) After expiration of the announcement period, switch the channel.

Channel scanning by each of the nodes implementing the channel selection mechanism, is done in a synchronized manner. Nodes are synchronized to common time intervals, i.e. epochs, in which the scanning procedure shall be performed. In order to be able to collect meaningful channel occupancy statistics, a mesh-wide timing synchronization is preferable in order to avoid the mesh's local traffic influencing the measurements of other nodes residing within its vicinity. This traffic however will be carried over to the new channel in case of a switch and should thus not play a part in determining a reasonable channel decision. However, preferably an AP does not initiate a scan if the arrival rate in its (transmit) queues is higher than 100 Mbps. Note also that, by synchronized scans, each AP gets the snapshot of the air almost for the same time period.

To perform synchronization, every mesh node, such as each of the access point AP 12, AP 14, AP 16 and AP 18 of FIG. 1, compares its local Timing Synchronization Function (TSF) value to the one embedded in beacons sent by other nodes in the wireless mesh network 10. If the remote TSF is higher than the local one, it is adopted. This assures a mesh-wide synchronization to the highest existent TSF.

With the TSF synchronization facilitated, scanning is performed within epochs, which are scheduled to start at all mesh nodes at the same time, i.e. the same TSF value.

Figure 3:
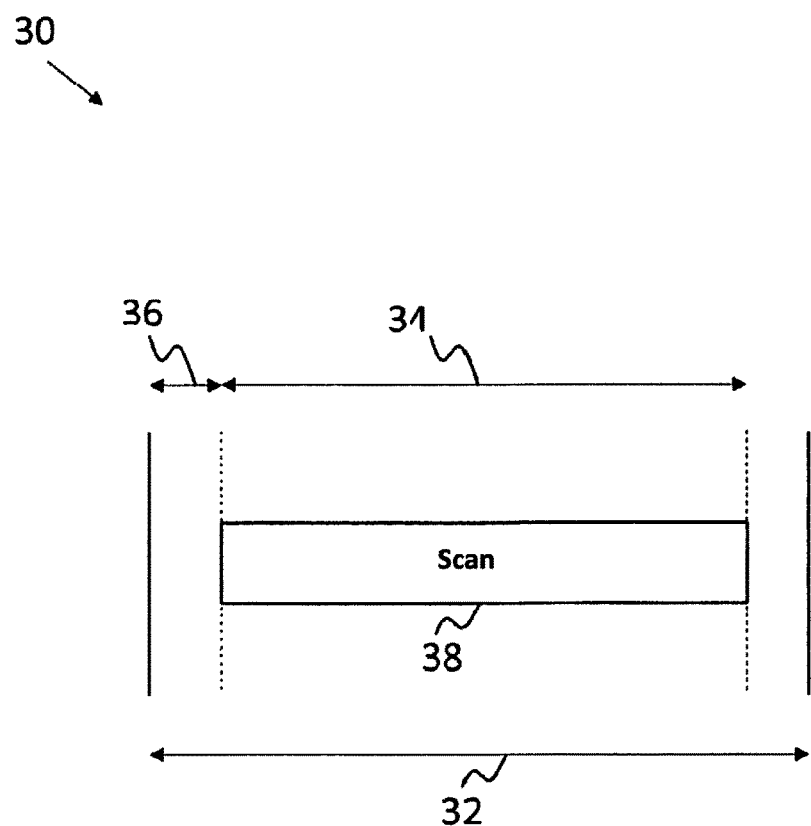
FIG. 3 is a diagram showing an element of synchronization according to an embodiment of the invention.

Such an epoch 30 is shown in FIG. 3. The epoch 30 is a synchronization epoch 30 of an epoch length 32 composed of at least a scan offset 36 and a dwell time 34. During each epoch 30, a single channel is scanned. The channel that is to be scanned is identical at all mesh nodes (e.g. the access points of FIG. 1) during each epoch 30, however each node is able to determine exactly this channel independently. The time interval between epochs 30, i.e. the scan frequency, is configurable but constant, as well as identical at all mesh nodes. In a preferable example, the scan frequency is 1 second. The interval at which scans are performed should be short enough to scan an entire band in a reasonable time while also being kept as long as possible to minimize impact on the mesh's throughput capabilities.

Right after entering an epoch 30, the mesh nodes freeze their transmission queues to avoid interfering with other nodes' measurements. Subsequently, the nodes wait for a small period of time, called a scan offset 36, to compensate any synchronization errors, which are measured to be around 5 ms. The start of the scanning procedure within an epoch is delayed by a configurable amount of time. Preferably, this delay should be kept minimal. In further examples, the scan offset 36 may default to 10 ms. Finally, the actual scan 38 is performed during a dwell time 34. The time spent in channels subject to a scan 38, i.e. the dwell time, is configurable but constant, as well as identical at all mesh nodes. In a preferable example, the dwell time is 50 ms. The dwell time should be chosen short enough to assure the completion of the scan 38 within the epoch 30. Moreover, it should be kept as long as possible to maximize reliance of the scan result.

If a scanning procedure cannot be completed within the time window defined by the epoch 30, the scan process may be aborted, the error logged, and the scan result invalidated.

Once a scan 38 is finished, the scanning device, which is at least one of the access points AP 12, AP 14, AP 16 and AP 18 in the example of FIG. 1, reads the scan results and updates the raw and time-averaged channel occupancy statistics, as described above.

After an epoch 30 has ended, the transmission queues are unfrozen and the next epoch 30 is scheduled, once again, for the same TSF value on all mesh nodes. Note that not only do mesh peers scan at the same time but they also scan the same channel to assure coherency between independent measurements. The length of an epoch is configurable but constant, as well as identical at all mesh nodes. In an example, the length of an epoch 32 is preferably 75 milliseconds. The epoch length 32 should be kept long enough to allow collection of reliable channel statistics while also being kept as short as possible to minimize impact on the mesh's throughput capabilities.

Preferably the dynamic channel selection mechanism described herein is a daemon that operates in respect of a 5 GHz band interface of a wireless network device, such as an access point, as described above. However, in further examples, the daemon may operate in respect of other interfaces, such as the 2.4 GHz band interface.

The list of channels that are scanned is configurable, as described above. Preferably, if the percentage of average idle time of a channel falls below a predetermined but configurable threshold, which is preferably set as 20%, at any mesh-AP, then the said channel shall be removed from the available channels list (by all APs). In other words, a channel shall not be listed in available channels list, if its percentage of average idle time is not above 20%.

Preferably, if the variance of percentage of idle time of a channel is above a predetermined but configurable threshold, which is preferably set as 30%, at any mesh-AP, then the said channel shall be removed from the available channels list (by all APs). In other words, a channel shall not be listed in available channels list, if its variance of percentage of average idle time is not below 30%.

Preferably, only channels with a bandwidth of 20 MHz shall be subject to scans. However, in further examples, channels with different bandwidths, such as 40 MHz can be subject to scans. As described above, the metrics for higher bandwidth channels can be derived from 20 MHz channel statistics.

The channel selection process is described in reference to FIG. 1 as being enabled at each of the access points AP 12, AP 14, AP 16 and AP 18, since all of the access point nodes in a wireless network, such as wireless mesh network 10 must operate on the same channel in order to avoid breaking the mesh network. However, in further examples, if there is a single access point in a wireless network, it may also run the channel selection daemon described above. Furthermore, if the wireless network 10 an access point that is part of an Ethernet network rather than a wireless mesh network, the access points can be configured to run the channel selection mechanism. Preferably all mesh nodes that are running the channel selection daemon collect channel occupancy statistics independently, i.e., no additional intra-mesh communication is necessary to facilitate the mesh-wide channel scanning mechanism, at any point in time.

Any node in the mesh network may compute the best channel, since every AP has the same set of metrics. However, the master node shall trigger the channel switch.

The collected channels statistics preferably include the percentage of the dwell time, in which the channel was observed to be idle. However, in further examples, other statistics can be collected in order to determine the decision to switch or maintain a channel.

Preferably, in the case that there are missing channel statistics from one or multiple mesh-APs, then the mesh-wise channel score shall not be computed for that scan period.

Preferably the mean and variance of channel scores shall be calculated within a sliding window of a configurable length that ensures reliable mean and variance values. The minimum sliding window length is 10 samples, in an example.

The access point (mesh node) having the numerically highest MAC address shall be declared as the master node, being responsible for channel switch decisions as well as initiation of the switching procedure. However, in further examples, other schemes for determining which access point is the master node may be implemented.

Data dissemination is preferably made by unicast addressing other access points in the wireless network 10, however, in further examples, data dissemination may be performed using broadcast addressing. Disseminated data shall preferably be sent using a bridge interface, thus being unbound in terms of the logical link utilized for dissemination (wireless, mesh, Ethernet, etc.). However, in further examples, other schemes for disseminating data could be implemented.

Advantageously, the disclosed dynamic channel selection (DCS) mechanism provides a smart, automatic channel selection for mesh networks during runtime. Although channels falling under DFS regulations shall not be considered as possible target channels—unless a separate method such as International Patent Publication Number WO 2013/110472 A1 is used to identify whether a DFS channel can be involved in the available channels list—, the decision on whether to switch to these channels can be given by a DFS re-entry daemon, as described herein. Beneficially, varying channel conditions shall be tracked and reacted to quickly and dynamically. This mechanism allows connectivity between mesh nodes to be preserved, i.e. every mesh node has to operate in the same channel to avoid breaking the mesh.

According to DFS regulations, an AP is required to run channel availability check (CAC) for a duration of 1 minute or an AP is required to run off-channel CAC for a duration of 6 minutes, before starting any transmission in a DFS channel. Due to this regulation, an AP cannot switch immediately to a DFS channel without losing connectivity with its mesh peers and its clients, unless off-channel CAC is implemented via a method such as that described in International Patent Publication Number WO 2013/110472 A1.

Whereas DCS aims at dynamically selecting and switching to a better non-DFS channel, the goal of a DFS re-entry daemon is to switch to the best DFS channel in an appropriate time during the day. In an effort to avoid service interruption for clients, DFS reentry shall be carried out, specifically early in the morning and when there is no activity in the network.

DFS reentry and DCS share the same channel statistics gathering and dissemination mechanisms. The only difference is the frequency of the decisions, and the amount of data collected before a decision is given. Whereas DCS acts quickly to switch to an interference free non-DFS channel in case of heavy interference, DFS re-entry aims at re-entering to a DFS channel, which allows for higher transmit power leading to improved coverage and performance for the entire network. It shall be noted that DFS-re-entry does not necessitate frequent periodic channel scans, and in fact in an exemplary embodiment DFS re-entry can be implemented such that a channel is only scanned once before a channel switch is to be triggered, which happens once during day, when there is negligible traffic in the network, and preferably when it is early hours of day.

The invention claimed is:

1. A wireless network device configured to operate within a wireless network, the wireless network device comprising:
   a wireless interface operable on a plurality of wireless channels;
   a memory; and
   a processor configured to,
      synchronize for each of the plurality of wireless channels, a set time duration with other wireless network devices that are operable in the wireless network,
      scan each of a plurality of channels for the synchronized set time duration when a rate of data arriving in a transmit queue of the wireless network device is less than a threshold such that the synchronized set time duration that the wireless device scans each of the plurality of channels is same as the synchronized set time duration each of the other wireless network devices scans same,
      make a channel quality assessment measurement during the set time duration for each of the plurality of channels,
      compare the channel quality assessment measurement for each channel with other channel quality assessment measurements from other network devices that are operable in the wireless network thereby to enable determination of a desired channel for communication between the wireless network device and the other network devices, and
operate on the desired channel.

2. The wireless network device according to claim 1, wherein the wireless network device is adapted to receive and store data, from other wireless network devices that are operable in the wireless network, in the memory.

3. The wireless network device according to claim 2, wherein the wireless network device disseminates the data stored in the memory to the wireless network.

4. The wireless network device according to claim 1, wherein the processor is adapted to synchronize the set time duration with other wireless network devices that are operable in the wireless network by commencing the set time duration at a same Timing Synchronization Function (TSF) value.

5. The wireless network device according to claim 1, wherein the set time duration is a dwell time in a synchronization epoch and the wireless network device is configured to freeze transmission when entering the synchronization epoch.

6. The wireless network device according to claim 5, wherein the processor is configured to perform the channel quality assessment measurement after a delay in the synchronization epoch.

7. The wireless network device according to claim 1, wherein the processor is adapted to determine a score based at least partly on the channel quality assessment measurement, thereby to determine the desired channel.

8. The wireless network device according to claim 7, wherein the processor is adapted to compare the score determined at the processor with scores received from other wireless network devices operable in the wireless network device, thereby to determine the desired channel.

9. The wireless network device according to claim 7, wherein the wireless network device is adapted to switch to the desired channel if the score exceeds a threshold.

10. The wireless network device according to claim 1, wherein the channel quality assessment measurement is based on a percentage of idle time observed on the plurality of channels.

11. The wireless network device according to claim 1, wherein the channel quality assessment measurement is an average channel quality assessment measurement of the channel quality assessment measurements during the synchronized set time duration and channel quality assessment measurements made by scanning the plurality of channels and making channel quality assessment measurements during a second synchronized set time duration that is synchronized with other wireless network devices that are operable in the wireless network for each of the plurality of channels.

12. The wireless network device according to claim 1, wherein the wireless network device is adapted to maintain a channel list in the memory, wherein the channel list is a list of available channels.

13. The wireless network device according to claim 1, wherein the wireless network device is configured to determine if a channel is being used by radar.

14. The wireless network device according to claim 13, wherein if the channel is being used by radar, the channel that is being used by radar is not on a list of available channels for a period of time.

15. The wireless network device according to claim 1, wherein the processor is further configured to determine if the wireless network device is a master node.

16. The wireless network device according to claim 15, wherein the wireless network device is adapted to initiate channel switching to the desired channel.

17. The wireless network device according to claim 1, wherein the processor is configured to scan a second channel for a second set time duration; and to make a second channel quality assessment measurement during the second set time duration.

18. A system comprising:
a plurality of wireless network devices configured to operate in a wireless network, the plurality of wireless network devices each including,
a wireless interface operable on a plurality of wireless channels;
a memory; and
a processor configured to,
synchronize for each of the plurality of wireless channels, a set time duration with other ones of the plurality of wireless network devices that are operable in the wireless network,
scan each of a plurality of channels for the synchronized set time duration when a rate of data arriving in a transmit queue of the wireless network device is less than a threshold such that the synchronized set time duration that the wireless device scans each of the plurality of channels is same as the synchronized set time duration each of the other ones of the plurality wireless network devices scans same, and
make a channel quality assessment measurement during the synchronized set time duration for each of the plurality of channels,
wherein at least one wireless network device of the plurality of wireless network devices is configured to,
compare the channel quality assessment measurement made by each of the plurality of wireless network devices for each of the plurality of channels thereby to determine a desired channel for communication between the at least one wireless network device and the other ones of the plurality of wireless network devices, and
initiate switching of the other ones of the plurality of wireless network devices to operate on the desired channel.

19. A method of operating a wireless network device in a wireless network, the method comprising:
scanning each of a plurality of channels for a set time duration when a rate of data arriving in a transmit queue of the wireless network device is less than a threshold;
making a channel quality assessment measurement during the set time duration for each of the plurality of channels;
synchronizing the set time duration for each of the plurality of channels with other wireless network devices that are operable in the wireless network and that scan the at least one channel and make channel quality assessment measurements during the synchronized set time duration for each of the plurality of channels such that the synchronized set time duration that the wireless device scans each of the plurality of channels is same as the synchronized set time duration each of other ones of the plurality wireless network devices scans same;
comparing the channel quality assessment measurement with other channel quality assessment measurements for each of the plurality of channels from other network devices that are operable in the wireless network thereby to enable determination of a desired channel for communication between the wireless network device and the other network devices; and operating the wireless network device on the desired channel.

* * * * *